(12) United States Patent
Bippes et al.

(10) Patent No.: US 11,788,481 B2
(45) Date of Patent: Oct. 17, 2023

(54) INTERNAL COMBUSTION ENGINE COMPRISING A METHANE-DME (NATURAL GAS-DIMETHYL ETHER) FUEL SUPPLY SYSTEM AND METHOD FOR OPERATING THE INTERNAL COMBUSTION ENGINE

(71) Applicant: MAN Truck & Bus SE, Munich (DE)

(72) Inventors: Michael Bippes, Braunschweig (DE); Martin Schüttenhelm, Braunschweig (DE); Christian Pastötter, Munich (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 17/625,726

(22) PCT Filed: Jul. 3, 2020

(86) PCT No.: PCT/EP2020/068758
§ 371 (c)(1),
(2) Date: Jan. 7, 2022

(87) PCT Pub. No.: WO2021/004911
PCT Pub. Date: Jan. 14, 2021

(65) Prior Publication Data
US 2022/0290623 A1    Sep. 15, 2022

(30) Foreign Application Priority Data
Jul. 8, 2019  (DE) .......................... 102019118364.2

(51) Int. Cl.
*F02D 19/06* (2006.01)
*F02D 19/08* (2006.01)
*F02D 19/10* (2006.01)

(52) U.S. Cl.
CPC ..... *F02D 19/0647* (2013.01); *F02D 19/0665* (2013.01); *F02D 19/082* (2013.01); *F02D 19/10* (2013.01)

(58) Field of Classification Search
CPC ............... F02D 41/064; F02D 41/0025; F02D 41/0027; F02D 19/0615; F02D 19/0692;
(Continued)

(56) References Cited

U.S. PATENT DOCUMENTS 10,184,440 B2 * 1/2019 Caley .................. F02D 19/0692
2008/0022965 A1   1/2008 Bysveen et al.
(Continued)

FOREIGN PATENT DOCUMENTS

DE    3109358 A1   3/1982
DE    60115926 T2  1/2006
(Continued)

OTHER PUBLICATIONS

German Search Report issued in German Patent Application No. 102019118364.2 dated Mar. 25, 2020. English translation not available.
(Continued)

*Primary Examiner* — Hai H Huynh
(74) *Attorney, Agent, or Firm* — WEBER ROSSELLI & CANNON LLP; Sebastian Kratzer

(57) ABSTRACT

The present disclosure relates to a combustion process for an internal combustion engine, in which a fuel mixture composed of a dimethyl ether-containing first fuel and a methane-containing second fuel is combusted, wherein the premixed fuel mixture or the fuels independently are fed directly to at least one combustion chamber of the internal combustion engine and/or indirectly via at least one intake pipe of the internal combustion engine upstream of the at least one combustion chamber, wherein the fuel mixture
(Continued)

present in the respective combustion chamber is combusted by self-ignition with addition of combustion air on the intake pipe side.

12 Claims, 1 Drawing Sheet

(58) Field of Classification Search
CPC .... F02D 19/10; F02D 19/082; F02D 19/0665; F02D 19/0647

USPC ............ 123/1 A, 3, 27 GE, 525, 431, 198 A
See application file for complete search history.

(56) References Cited

U.S. PATENT DOCUMENTS

| | | |
|---|---|---|
| 2009/0020631 A1 | 1/2009 | Mashida et al. |
| 2014/0123937 A1 | 5/2014 | Wickstone et al. |
| 2019/0162123 A1 | 5/2019 | Ante et al. |

FOREIGN PATENT DOCUMENTS

| | | |
|---|---|---|
| DE | 102015212244 A1 | 1/2017 |
| EP | 2609302 B1 | 8/2016 |

OTHER PUBLICATIONS

PCT Search Report and Written Opinion issued in PCT Application No. PCT/EP2020/068758 dated Oct. 13, 2020, with English translation of ISR, 15 pages.

* cited by examiner

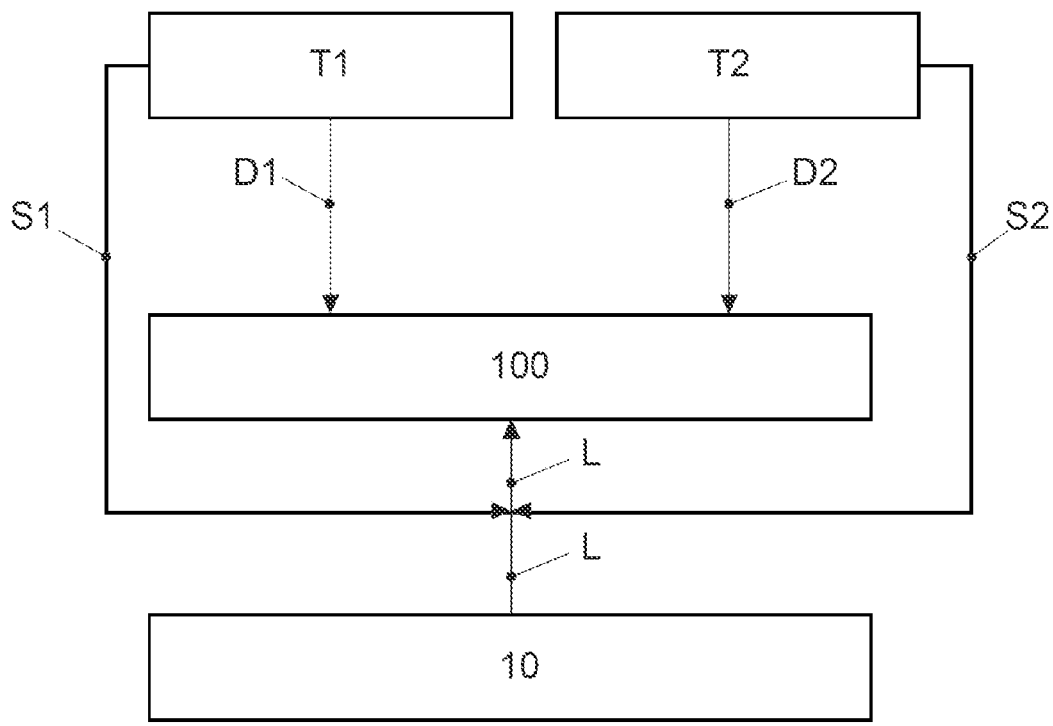

INTERNAL COMBUSTION ENGINE COMPRISING A METHANE-DME (NATURAL GAS-DIMETHYL ETHER) FUEL SUPPLY SYSTEM AND METHOD FOR OPERATING THE INTERNAL COMBUSTION ENGINE

The present disclosure relates to a self-ignition combustion process for an internal combustion engine, in which a fuel mixture composed of two fuels is combusted.

BACKGROUND

Documents DE 31 09 358 A1 and EP 2 609 302 B1 describe fuels for operation of an internal combustion engine. Document DE 31 09 358 A1 discloses a liquid fuel for use in an automobile, which is characterized in that it consists of 50% to 75% dimethyl ketone and 25% to 50% gasoline, the latter being essentially free of tetraethyllead. Document EP 2 609 302 B1 describes a combustion fluid which is used in liquid form in the heat recovery cycle. The document also teaches internal combustion engines that are operated with fuels such as dimethyl ether (DME) or with ammonia-water solutions, both of which are compatible with heat recovery cycles. A further example in the document cited is that of dual-fuel engines, in which a first fuel comprising methane, ethane, propane, butane or mixtures thereof, and a second fuel, such as gasoline or diesel fuel, are injected separately into the combustion chamber of a self-ignition engine.

The present disclosure that follows is likewise based on the basic concept of using two fuels that are dissimilar at first glance as fuels for an internal combustion engine.

It is thus an object of the present disclosure to provide an alternative fuel supply system with hitherto unusual fuels, with which an internal combustion engine can be supplied with fuel with high efficiency and low emissions on the exhaust gas side and especially with low soot formation, as elucidated hereinafter.

In the context of the energy revolution, increasing attention is being attracted by synthetic fuels having favorable combustion properties, which constitute alternatives to conventional fuels (diesel/gasoline).

Especially methane as such or in the form of natural gas and dimethyl ether (DME) can now be produced with high efficiencies from hydrogen that preferably comes from renewable energies and $CO_2$ coming from unavoidable sources or from the atmosphere. Dimethyl ether is a colorless (under standard conditions), highly flammable, and anesthetizing gas. Natural gas is a combustible gas mixture of natural origin that occurs in underground deposits. Natural gas consists mainly of highly flammable methane.

Methane as such or natural gas (summarized by the term "methane" hereinafter) may be provided to vehicles either in liquid form as LNG [liquefied natural gas] or in gaseous form as CNG [compressed natural gas].

DME in turn can be passed onward as a pressurized liquid or gaseous fuel.

One aspect on which the concept of the present disclosure is based is that both methane and DME have low-soot burning characteristics.

The present disclosure is also based on the knowledge that methane is a very compression-resistant fuel which is thus preferentially suitable in accordance with the present disclosure for an externally ignited combustion process.

DME in turn is a less compression-resistant fuel and is thus more suitable for a self-ignited combustion process, it being clear to the person skilled in the art that self-ignited combustion processes have a higher efficiency than externally ignited combustion processes.

The present solution according to the present disclosure is that methane that would in principle be more likely to be used by the person skilled in the art for an externally ignited combustion process—as elucidated—is now being used according to the present disclosure in a self-ignition combustion process, where this use of methane in a self-ignition combustion process is effected with the aid of DME, as elucidated further hereinafter.

SUMMARY

According to the present disclosure, an internal combustion engine, in a first embodiment, is supplied with a mixture of methane and DME, wherein the fuels mentioned are premixed in a storage vessel. It is ensured here that the DME fuel does not become separated as a result of a change in pressure or temperature, or in the case of liquid LNG as a result of the known boil-off effect, which would result in unequal mixing ratios. It is also ensured at the same time that the amount of DME dissolved in the methane is sufficient to be able to conduct the self-ignition combustion process envisaged in accordance with the present disclosure.

The internal combustion engine thus comprises a fuel vessel in which a premixed fuel mixture of a dimethyl ether-containing first fuel and a methane-containing second fuel is stored, wherein the fuel mixture (DME/methane) is fed directly to at least one combustion chamber of the internal combustion engine and/or indirectly via at least one intake pipe of the internal combustion engine upstream of the at least one combustion chamber, and is combusted by self-ignition with addition of combustion air on the intake pipe side.

In the case of such a premixed fuel (mixture of methane and DME), however, one disadvantage is that, in the course of operation of the internal combustion engine, it is more difficult to react to the emission demands that exist at various load points, and therefore a second embodiment is proposed, the principle of which is that the fuel supply system of the motor vehicle in a first execution variant has at least two fuel storage facilities, or in another second execution variant three fuel storage facilities, as elucidated hereinafter.

In the first execution variant, the internal combustion engine comprises a first fuel vessel in which a dimethyl ether-containing first fuel and a second fuel vessel are comprised, in which a methane-containing second fuel is stored, which are combined separately from one another directly in at least one combustion chamber of the internal combustion engine and/or indirectly via at least one intake pipe of the internal combustion engine upstream of the at least one combustion space to give a fuel mixture which is combusted by self-ignition in the combustion chamber with addition of combustion air on the intake pipe side.

In the second execution variant, the internal combustion engine comprises a first fuel vessel in which a dimethyl ether-containing first fuel and a second fuel vessel are comprised, in which a methane-containing gas (LNG) as a second fuel and a third fuel vessel are comprised, in which a likewise methane-containing gas (CNG) as third fuel, different than the second fuel, is stored, wherein the first fuel are combined separately from the second or third fuel (LNG, CNG) directly in at least one combustion chamber of the internal combustion engine and/or indirectly via an intake pipe of the internal combustion engine upstream of the at least one combustion chamber to give a fuel mixture (DME/methane) which is combusted in the combustion chamber with addition of combustion air (L) on the intake pipe side.

BRIEF DESCRIPTION OF THE DRAWING

FIG. 1 represents a fuel supply system as described herein.

DETAILED DESCRIPTION

Further aspect of the first execution variant:

Addressed first of all is the first execution variant in which the fuel supply system (cf. FIG. 1) has two fuel vessels T1 and T2 and corresponding supply conduits to the combustion chamber of the internal combustion engine.

According to the present disclosure, the first fuel vessel T1 stores DME, while the other second fuel vessel T2 stores methane as such or natural gas, preferably cryogenic LNG in the fuel vessel T2-LNG customary for the purpose (in liquid form, optionally with a utilizable gas cushion above the liquid phase) or CNG (in gaseous form) in a fuel vessel T2-CNG (pressurized tank) customary for the purpose.

According to the present disclosure, a combustion chamber of the internal combustion engine, in various intake scenarios (that are yet to be elucidated), is supplied with a mixture of DME and methane, and an appropriately definable volume of air.

According to the present disclosure, the internal combustion engine is operated analogously to a self-ignition process wherein, in the ideal case, a homogeneous mixture of DME, methane and combustion air is formed, such that two effects are brought about, namely that the combustion that takes place results firstly in ignition of the DME and formation of a flame, by which the effect is generated that the enthalpy provided by the combustion of the DME and the flame generated enable ignition of the methane. It will be apparent that methane also self-ignites at appropriate pressure and appropriate temperature, but the pressure required for the purpose and the temperature required for the purpose in particular are significantly higher than for DME, such that, in an advantageous manner, DME is used as the "igniting fuel" for methane, which is considered to be an essential solution provided by the present disclosure. It becomes clear from this description that external ignition devices are advantageously not required in accordance with the present disclosure. What is provided for is thus the generation of a gaseous mixture of DME, methane (CNG or LNG), and combustion air in each case, which is supplied to the combustion chamber, wherein, in other words, all components are in gaseous form (LNG is correspondingly evaporated by the use of a heat transferer or the gas cushion in the T2-LNG fuel vessel is utilized) and are ideally homogeneously distributed, such that, in the operation of the internal combustion engine, there is homogeneous burning of the gaseous mixture of DME, methane and combustion air. This means that the internal combustion engine can be executed and configured similarly to a diesel fuel-operated internal combustion engine. In other words, it is now possible to use a fuel consisting mainly of a gasoline fuel mixed with DME—to which methane as such or LNG or CNG is added without the aid of a diesel engine.

According to FIG. 1, the injection scenarios that exist in principle for the fuels are those that follow, which are illustrated in FIG. 1. It is fundamentally the case that skillful selection of the injection site and the time of injection, and variation in the proportions of the fuels that contribute to the formation of the fuel mixture, can optimize the combustion with regard to the times of ignition. In this way, it is possible to optimize the formation of emissions, for example HC (uncombusted hydrocarbons) and/or soot and/or CO (carbon monoxide).

The configuration of the fuel supply system with two fuel vessels T1, T2 and the provision of two fuels, DME and methane (as such or LNG, CNG), enables more controlled reaction of the internal combustion engine to environmental conditions such as temperature and the demands of the different load points, and their different emission characteristics. It is possible for the two fuels to be supplied at different times and places (direct injection D1, D2 and intake pipe injection S1, S2).

As elucidated, the fuel supply system, in the first execution variant, has the first fuel vessel T1 in which DME is stored in accordance with the present disclosure, while the other, second fuel vessel T2 stores methane as such or as natural gas, preferably cryogenic LNG, in the fuel vessel T2-LNG customary for the purpose (in liquid form, optionally with a utilizable gas cushion above the liquid phase) or CNG (in gaseous form) in a fuel vessel T2-CNG (pressurized tank) customary for the purpose. A compressor 10 preferably provides for the generation of the charging air L, which is supplied to an intake pipe disposed between compressor 10 and combustion chamber of the internal combustion engine.

First Injection Scenario:

For supply of the fuels, according to the present disclosure, direct injection D1, D2 into the combustion chamber is provided. This means that DME is taken from the first fuel vessel T1 and injected according to reference numeral D1 directly into the combustion chamber(s) of the internal combustion engine. In addition, methane as such or LNG or CNG is taken from the fuel vessel T2 and injected directly into the combustion chamber(s) of the internal combustion engine according to reference numeral D2.

Second Injection Scenario:

For supply of the fuels, according to the present disclosure, intake pipe injection S1, S2 into the combustion chamber is provided. This means that DME is taken from the first fuel vessel T1 and injected according to reference numeral S1 via the intake pipe and supplied to the combustion chamber(s) of the internal combustion engine. In addition, methane as such or LNG or CNG is taken from the fuel vessel T2 and injected by the intake pipe and supplied to the combustion chamber(s) of the internal combustion engine according to reference numeral S2.

Third Injection Scenario:

Direct injection D1, D2 and intake pipe injection S1, S2 are combined.

Methane as such or LNG or CNG is taken from the fuel vessel T2 and injected directly into the combustion chamber(s) of the internal combustion engine according to reference numeral D2, while DME is taken from the first fuel vessel T1 and injected according to reference numeral S1 by the intake pipe and supplied to the combustion chamber(s) of the internal combustion engine.

Fourth Injection Scenario:

Direct injection D1, D2 and intake pipe injection S1, S2 are combined.

Methane as such or LNG or CNG is taken from the fuel vessel T2 and injected according to reference numeral S2 via the intake pipe and supplied to the combustion chamber(s) of the internal combustion engine, while DME is taken from the first fuel vessel T1 and injected according to reference numeral D1 directly into the combustion chamber(s) of the internal combustion engine.

Preferred Injection Scenarios:

The first and fourth injection scenarios are considered to be preferred configurations because DME, as elucidated above, by providing the enthalpy by the compression and by the flame generated thereby, is intended to bring about ignition of the methane. However, the intake of the methane should not already take place on the intake pipe side, which is the reason why it is preferably the case that DME is taken from the first fuel vessel T1 and injected directly according to reference numeral D1 into the combustion chamber(s) of the internal combustion engine. Methane as such or LNG or CNG is taken from the fuel vessel T2 and likewise fed directly according to reference numeral D2 into the combustion chamber(s) of the internal combustion engine (first injection scenario) or according to reference numeral S2 injected by the intake pipe and supplied to the combustion chamber(s) of the internal combustion engine (fourth injection scenario).

Further aspects of the second execution variant:

The second execution variant will be discussed subsequently, in which the fuel supply system has, for example, three fuel vessels T1, T2-LNG and T3-CNG, and corresponding supply conduits to the combustion chamber 100 of the internal combustion engine.

In a known manner, it is a problem with cryogenic LNG taken in gaseous form, for example, from the gas phase in the fuel vessel T2-LNG that it cools down further on expansion, such that supply results in ice buildup in the supply equipment (injectors, pressure reducers etc.).

According to the present disclosure, in the second execution variant (not shown), it is envisaged that the motor vehicle, as well as the fuel vessel T2-LNG, has a further fuel vessel T3-CNG that provides gaseous CNG at a minimum pressure level, which can be employed when required, and is considered to be required when, in the starting phase or in a cold start phase, especially in what is called the ultracold launch of the vehicle, gaseous CNG from the further fuel vessel T3-CNG is utilized, which avoids the ice buildup problems with the LNG, which is no longer supplied in this proposed procedure, especially in the cold start phase.

In summary, what is thus envisaged is the production of a gaseous mixture of DME, methane (CNG or LNG) and combustion air which is supplied to the combustion chamber 100, in which case, in other words, all components are in gaseous form and ideally homogeneously distributed, such that, in the operation of the internal combustion engine, there is homogeneous burning of the gaseous mixture of DME and CNG and combustion air, especially for the cold start phase of the motor vehicle, and a mixture of DME and LNG and combustion air, it being possible in an exceptional manner to use one of the two mixtures as required in the second execution variant.

It will be apparent that, in the second execution variant, further injection scenarios are significant, which depend on whether LNG or CNG is used. In other words, if LNG is used in one of the abovementioned injection scenarios, the present disclosure proposes utilization of gaseous CNG (cold launch of the motor vehicle), optionally in the start phase or in a cold start phase of the motor vehicle, with subsequent continued operation of the internal combustion engine with the gaseous CNG as fuel for mixture formation or, after cold launch, switching to LNG as fuel for mixture formation at a predefinable juncture.

In summary, by way of a statement for delimitation from the prior art, methane is used as fuel in external ignition methods in known concepts.

According to the present disclosure, the use of DME to form a methane-DME fuel mixture according to the procedure disclosed in the description and the claims can give rise to use of a self-ignition process. Efficiency is advantageously enhanced compared to an external ignition process; emissions, especially soot formation, are advantageously reduced by a load-dependent mixing ratio in particular of the fuel components methane (as such and/or CNG and/or LNG) and DME. What is also taught is the preferred use of the internal combustion engine with the fuel system described and the corresponding combustion process of the present disclosure in motor vehicles, especially in heavy utility vehicles or ships' engines or stationary generators.

LIST OF REFERENCE NUMERALS 100 combustion chamber of an internal combustion engine
10 compressor
T1 first fuel vessel
T2 second fuel vessel
T2-LNG second fuel vessel filled with LNG
T2-CNG second fuel vessel filled with CNG
T3 third fuel vessel
T3-CNG third fuel vessel filled with CNG
D1 direct injection
D2 direct injection
S1 intake pipe injection
S2 intake pipe injection
L combustion air

The invention claimed is:

1. An internal combustion engine comprising a first fuel vessel in which a dimethyl ether-containing first fuel and a second fuel vessel in which a methane-containing second fuel is stored, which are combined separately from one another in at least one combustion chamber of the internal combustion engine indirectly via at least one intake pipe of the internal combustion engine upstream of the at least one combustion chamber to give a fuel mixture which is combusted by self-ignition in the combustion chamber with addition of combustion air on the intake pipe side.

2. The internal combustion engine as claimed in claim 1, characterized in that the second fuel vessel is an LNG fuel vessel or a CNG fuel vessel in which either LNG or CNG is stored.

3. The internal combustion engine as claimed in claim 1, characterized in that, between the fuel vessel(s) and the at least one combustion chamber and/or the at least one intake tube, feed conduits are disposed for supply of the individual fuels to the at least one combustion chamber and/or the at least one intake pipe.

4. An internal combustion engine comprising a first fuel vessel in which a dimethyl ether-containing first fuel and a second fuel vessel in which a methane-containing gas as a second fuel and a third fuel vessel in which a likewise methane-containing gas as third fuel, different than the second fuel, is stored, wherein the first fuel are combined separately from the second or third fuel in at least one combustion chamber of the internal combustion engine indirectly via an intake pipe of the internal combustion engine upstream of the at least one combustion chamber to give a fuel mixture which is combusted in the combustion chamber with addition of combustion air on the intake pipe side.

5. The internal combustion engine as claimed in claim 4, characterized in that the second fuel vessel is an LNG fuel vessel and the third fuel vessel is a CNG fuel vessel in which LNG and CNG are stored separately from one another.

6. The internal combustion engine as claimed in claim 4, characterized in that, between the fuel vessel(s) and the at least one combustion chamber and/or the at least one intake tube, feed conduits are disposed for supply of the individual fuels to the at least one combustion chamber and/or the at least one intake pipe.

7. A combustion process for an internal combustion engine using an internal combustion engine comprising a fuel vessel in which a premixed fuel mixture composed of a dimethyl ether-containing first fuel and a methane-containing second fuel is stored, in which the fuel mixture composed of the dimethyl ether-containing first fuel and the methane-containing second fuel is combusted, wherein the premixed fuel mixture is fed to at least one combustion chamber of the internal combustion engine directly and/or indirectly via at least one intake pipe of the internal combustion engine upstream of the at least one combustion chamber, wherein the fuel mixture present in the respective combustion chamber is combusted by self-ignition with addition of combustion air on the intake pipe side.

8. A combustion process for an internal combustion engine using an internal combustion engine comprising a first fuel vessel in which a dimethyl ether-containing first fuel and a second fuel vessel in which a methane-containing second fuel is stored, in which a fuel mixture composed of the dimethyl ether-containing first fuel and the methane-containing second fuel is combusted, wherein the fuels independently are fed to at least one combustion chamber of the internal combustion engine directly and/or indirectly via at least one intake pipe of the internal combustion engine upstream of the at least one combustion chamber, wherein the fuel mixture present in the respective combustion chamber is combusted by self-ignition with addition of combustion air on the intake pipe side.

9. The combustion process as claimed in claim 8, characterized in that
the first fuel is taken from the first fuel vessel and injected directly into the combustion chamber(s) of the internal combustion engine, while the second fuel is taken from the fuel vessel and likewise injected directly into the combustion chamber(s) of the internal combustion engine, or
the first fuel is taken from the first fuel vessel and injected via the intake pipe and fed to the combustion chamber(s) of the internal combustion engine, while the second fuel is taken from the fuel vessel and likewise injected by the intake pipe and fed to the combustion chamber(s) of the internal combustion engine, or
the first fuel is taken from the first fuel vessel and injected by the intake pipe and fed to the combustion chamber(s) of the internal combustion engine, while the second fuel is taken from the fuel vessel and injected directly into the combustion chamber(s) of the internal combustion engine, or
the first fuel is taken from the first fuel vessel and injected directly into the combustion chamber(s) of the internal combustion engine, while the second fuel is taken from the fuel vessel and injected via the intake pipe and fed to the combustion chambers of the internal combustion engine.

10. A combustion process for an internal combustion engine using an internal combustion engine comprising a first fuel vessel in which a dimethyl ether-containing first fuel and a second fuel vessel in which a methane-containing gas as a second fuel and a third fuel vessel in which a likewise methane-containing gas as third fuel, different than the second fuel, is stored, in which a fuel mixture composed of the dimethyl ether-containing first fuel and the methane-containing second fuel is combusted, wherein the fuels independently are fed to at least one combustion chamber of the internal combustion engine directly and/or indirectly via at least one intake pipe of the internal combustion engine upstream of the at least one combustion chamber, wherein the fuel mixture present in the respective combustion chamber is combusted by self-ignition with addition of combustion air on the intake pipe side.

11. The combustion process as claimed in claim 10, characterized in that
the first fuel is taken from the first fuel vessel and injected directly into the combustion chamber(s) of the internal combustion engine, while the second fuel is taken from the fuel vessel and likewise injected directly into the combustion chamber(s) of the internal combustion engine, or
the first fuel is taken from the first fuel vessel and injected via the intake pipe and fed to the combustion chamber(s) of the internal combustion engine, while the second fuel is taken from the fuel vessel and likewise injected by the intake pipe and fed to the combustion chamber(s) of the internal combustion engine, or
the first fuel is taken from the first fuel vessel and injected by the intake pipe and fed to the combustion chamber(s) of the internal combustion engine, while the second fuel is taken from the fuel vessel and injected directly into the combustion chamber(s) of the internal combustion engine, or
the first fuel is taken from the first fuel vessel and injected directly into the combustion chamber(s) of the internal combustion engine, while the second fuel is taken from the fuel vessel and injected via the intake pipe and fed to the combustion chambers of the internal combustion engine.

12. A combustion process for an internal combustion engine using an internal combustion engine comprising a first fuel vessel in which a dimethyl ether-containing first fuel and a second fuel vessel in which a methane-containing gas as a second fuel and a third fuel vessel in which a likewise methane-containing gas as third fuel, different than the second fuel, is stored, in which a fuel mixture composed of the dimethyl ether-containing first fuel and the methane-containing second fuel is combusted, wherein the fuels are independently fed to at least one combustion chamber of the internal combustion engine directly and/or indirectly via at least one intake pipe of the internal combustion engine upstream of the at least one combustion chamber, wherein the fuel mixture present in the respective combustion chamber is combusted by self-ignition with addition of combustion air on the intake pipe side, wherein, in a cold start phase, a fuel mixture of DME and CNG is formed and used and then continues to be used or, after a given time, a fuel mixture of DME and LNG is formed and used.

\* \* \* \* \*